Aug. 30, 1927.  1,641,133
J. H. O. BUNGE
APPARATUS FOR FEEDING MOLTEN GLASS
Filed Oct. 22, 1925
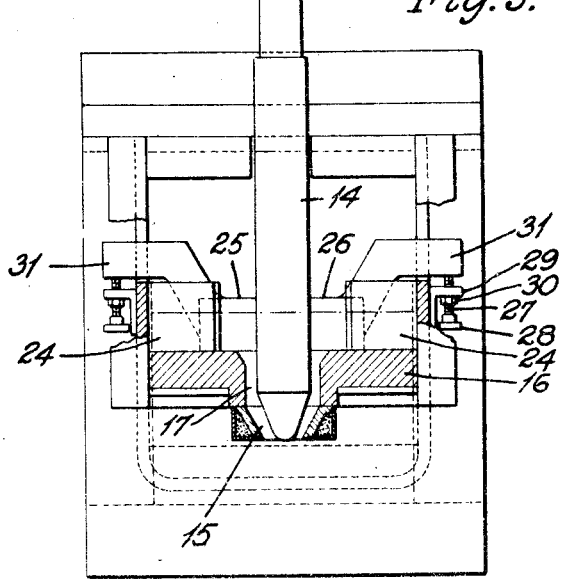
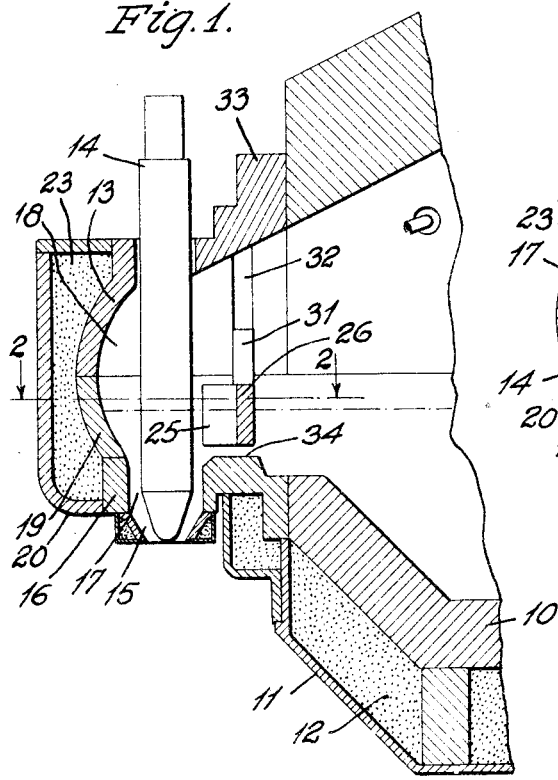
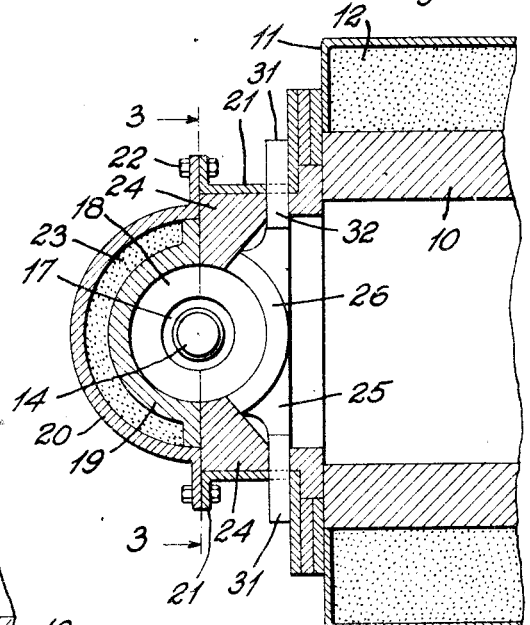
Inventor:
Julius H. O. Bunge
by Robson D. Brown
Atty.

Patented Aug. 30, 1927.                                1,641,133

UNITED STATES PATENT OFFICE.

JULIUS H. O. BUNGE, OF LONDON, ENGLAND, ASSIGNOR TO HARTFORD-EMPIRE COMPANY, OF HARTFORD, CONNECTICUT, A CORPORATION OF DELAWARE.

APPARATUS FOR FEEDING MOLTEN GLASS.

Application filed October 22, 1925. Serial No. 64,123.

My invention relates to glass feeding apparatus and has particular relation to forehearths or spouts for conditioning and delivering molten glass.

The object of this invention is to improve upon the uniformity and consistency of glass mold charges by providing, in a glass feeding forehearth, a vertically adjustable gate, preferably of arcuate shape which will form a continuation of the wall of the feeding chamber and cooperate with it to provide a well in which a discharge-controlling plunger may properly operate; which will prevent the dross or impurities floating on the surface of the glass in the forehearth from entering the feeding chamber; which will accurately control the rate of flow of the under-surface glass entering the feeding chamber beneath the gate and the distribution of the glass about the plunger; and which will permit of an unobstructed passage above the gate of the flames or hot gases from the forehearth to the feeding chamber so as to insure that the glass in the vicinity of the discharge orifice will be maintained at all times at a uniform working temperature.

In the accompanying drawings:

Figure 1 is a vertical longitudinal sectional view of a glass feeding apparatus, taken on line 1—1 of Fig. 2, showing the essential features of apparatus constructed in accordance with my invention;

Fig. 2 is a horizontal sectional view through the forehearth taken on the line 2—2 of Fig. 1; and Fig. 3 is a front elevation, partly in section on the line 3—3 of Fig. 2, showing the gate lowered and the front of the spout removed.

Referring to the drawings, the numeral 10 indicates a portion of a glass conduit which may be a forehearth connected to a melting furnace, not shown, and which is surrounded by a casing 11 located in such a position as to provide a space for heat insulating material 12. This conduit communicates at its outer end with a spout or feeding chamber 13 in which a plunger 14 is arranged to reciprocate vertically above a discharge orifice 15 for the purpose of controlling the discharge of molten glass through the orifice in successive mold charges adaptable to be conveyed to or deposited in the molds of a glass shaping machine, not shown. The mechanism for mounting and reciprocating the plunger 14 may be such as is commonly employed in this art, and is therefore not shown herein.

The spout 13 comprises a refractory bottom portion 16 forming a restricted well 17 into which the lower end of the plunger 14 extends, and which is connected at its lower end with the orifice 15 while its upper end communicates with a feeding chamber 18. A refractory front wall 19 rests upon the bottom portion 16 and forms a part of the feeding chamber. The members 16 and 19 are surrounded by a casing 20 which is attached to projecting side angles 21 by bolts 22. A space is formed between the casing 20 and the members 16 and 19 for containing a heat insulating material 23.

The side angles 21 also serve the purpose of positioning two edge blocks 24 which form a part of the feeding chamber 18, and which function as abutments for a gate 25 provided with a glass-engaging dam 26. This gate is of arcuate form and completes the circular enclosed chamber construction of the spout structure.

The gate 25 is provided with oppositely extending arms 31 which project laterally through slots 32 formed in the side walls of the forehearth above the level of the glass and are supported at their outer ends at a point remote from the heat of the forehearth by vertically adjustable studs 27. These studs are threaded through brackets 29 carried by the side angles 21, and are provided with hand wheels 28 by means of which the gate may be raised or lowered in order to control the flow of the under-surface glass from the conduit 10 into the feeding chamber 18. The gate may be maintained in the desired adjusted position by lock nuts 30 which are threaded upon the studs 27 for engagement with the brackets 29.

When the hand wheels 28 are operated to raise the gate 27 to the desired extent, the under stratum of molten glass contained within the conduit 10 is permitted to flow beneath the gate at the desired rate and volume to supply the chamber with refined glass at a location within the lower portion of the spout and well where it quickly reaches the orifice 15 and is ready to be discharged in mold charges of proper plastic condition throughout, by the reciprocatory action of the plunger 14.

If injury or erosion necessitates the removal of the gate 25, the plunger 14 may be lowered to close the orifice 15 and stop the flow of glass from the spout chamber 18, or a closure member may be applied to the orifice from beneath. The gate 25 is then lifted from the forehearth, after removing top blocks 33, by guiding the arms 31 through the slots 32, or, should the gate be broken, the portion thereof may be withdrawn from above by means of tongs.

By lowering the gate so as to rest upon a sill 34 provided in the spout structure, the flow of molten glass from the forehearth to the spout may be shut off, thereby providing a simple and convenient method for removing and renewing the plunger and the front portion of the spout. This gate is so formed that its top will, in all of its adjusted positions, extend above the glass level so that the gate acts as a dam to prevent the inflow to the discharge chamber of impurities floating upon the surface of the glass. However, in none of its adjusted positions does the top of the gate extend to a height where it will interfere with the free entrance into the discharge chamber of flame or hot gases projected forwardly into the spout chamber from the forehearth, such gases being supplied, for example, by a burner 35.

One type of plunger glass feeder which is now in extensive commercial use, employs a vertically adjustable refractory tube which surrounds the plunger and acts as a gate to control the quantity of glass admitted to the discharge orifice, or as a shut-off gate to stop the flow of glass entirely. The structure of my present invention, as described above, gives somewhat similar results in respect to the conditioning of the glass and the accurate control of its flow. In addition, my present invention provides for the free access of heating flames or hot gases into the space immediately above the glass surrounding the plunger.

This invention is not limited to the particular details of construction set forth herein, and modifications may be resorted to without departing from the scope of the appended claims.

I claim as my invention:

1. Glass feeding apparatus comprising a container including a cylindrical discharge chamber having an outlet, a discharge-controlling plunger in working alignment with said outlet, and an arcuate gate adjacent to and at one side of said plunger and forming a continuation of the wall of the said chamber for controlling the admission of glass to said outlet.

2. Glass feeding apparatus comprising a container including a discharge chamber having an outlet, a discharge-controlling plunger in working alignment with said outlet, and a gate adjacent to and at one side of said plunger for controlling the admission of glass to said outlet, said gate being arranged to permit free access of heating gases into the said discharge chamber.

3. Glass feeding apparatus comprising a glass-conduit terminating in a discharge chamber having a restricted well and an outlet below said well, a discharge-controlling plunger in working alignment with said outlet and adapted to enter said well, and a gate adjacent to and at one side of said well for controlling the admission of glass to said discharge chamber and said well, said gate being arranged to permit free passage of heating gases over said gate and into said discharge chamber.

4. In glass feeding apparatus, the combination of a forehearth containing a conduit for the passage of molten glass therethrough, a feeding chamber connected therewith, and a gate forming a part of the walls of said feeding chamber and adapted to control the passage of molten glass from the conduit to said feeding chamber.

5. In glass feeding apparatus, the combination of a forehearth containing a conduit for the passage of molten glass therethrough, a feeding chamber connected therewith, and an arcuate gate forming a part of said feeding chamber and adapted to be raised and lowered to control a flow of molten glass therebeneath from the conduit to said feeding chamber.

6. In glass feeding apparatus, the combination of a forehearth containing a conduit for the passage of molten glass therethrough, a feeding chamber into which flame may be projected from said forehearth, a gate forming a part of the feeding chamber and provided with a dam, and means for raising and lowering said gate to permit molten glass to flow therebeneath without interfering with the entrance of said flame from the forehearth over the dam into the feeding chamber.

7. In glass feeding apparatus, the combination of a forehearth containing a conduit for the passage of molten glass therethrough, a gate of arcuate shape forming a part of the wall of said feeding chamber, and a plunger operable within said feeding chamber adapted to cooperate with said orifice to close the same to prevent the outflow of glass therefrom so as to permit the removal of said gate.

8. A glass feeding device comprising a forehearth, a feeding chamber communicating therewith and having an orifice therein, a plunger cooperating with said orifice, a gate disposed between said forehearth and said feeding chamber, means for adjusting said gate in a vertical direction to permit a predetermined volume of the under-surface glass in the forehearth to flow into said said feeding chamber at a predetermined rate to the exclusion of dross of impurities
5. floating upon the surface of the glass, and a burner disposed within said forehearth for heating the glass therein and adapted to project a flame over said gate and into said feeding chamber to maintain the glass in the vicinity of said orifice at a uniform temperature.

Signed at London, England this 12th day of October, 1925.

JULIUS H. O. BUNGE.